F. S. INGOLDSBY.
DUMP CAR.
APPLICATION FILED OCT. 17, 1907.

993,449.

Patented May 30, 1911.
8 SHEETS—SHEET 1.

F. S. INGOLDSBY.
DUMP CAR.
APPLICATION FILED OCT. 17, 1907.

993,449.

Patented May 30, 1911.
8 SHEETS—SHEET 2.

WITNESSES:
Brennan B. West
Nathan F. Fretter

INVENTOR.
Frank S. Ingoldsby
By Bates, Fouts & Hull
ATTYS.

F. S. INGOLDSBY.
DUMP CAR.
APPLICATION FILED OCT. 17, 1907.
993,449.
Patented May 30, 1911.
8 SHEETS—SHEET 3.
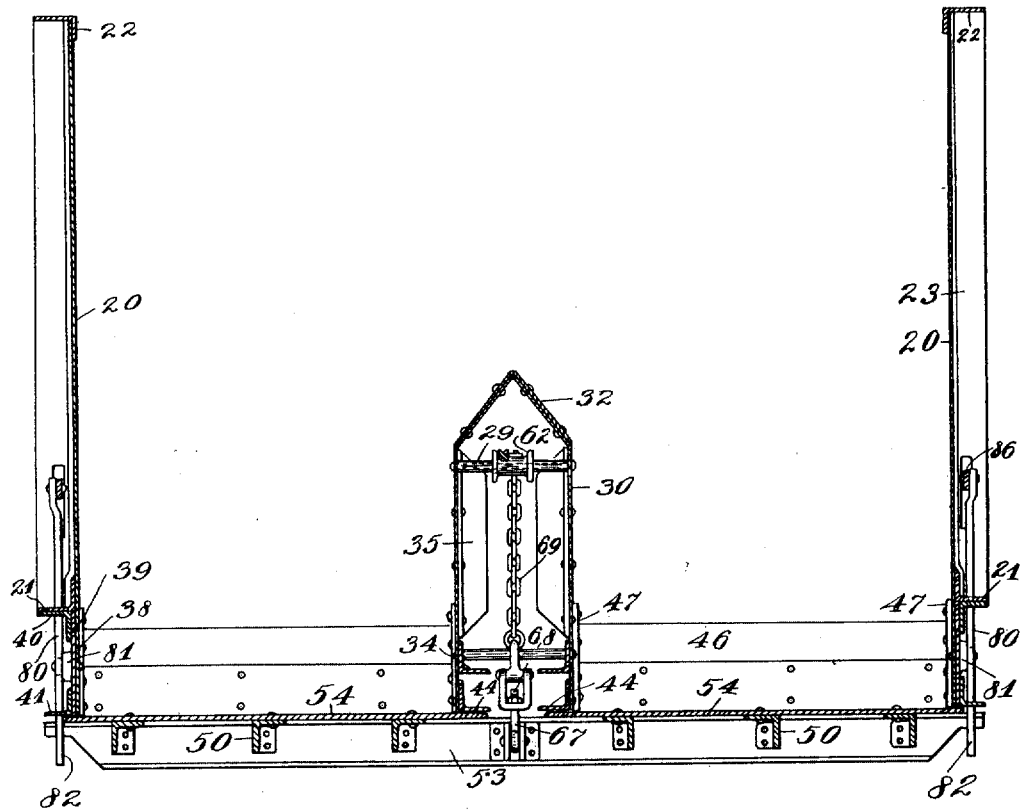
FIG. 3
FIG. 11
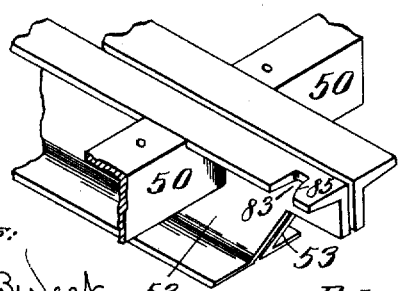
WITNESSES:
Brennan B. West
Nathan F. Fretter
INVENTOR,
Frank S. Ingoldsby
BY Baker, Jones & Hull
ATTYS.

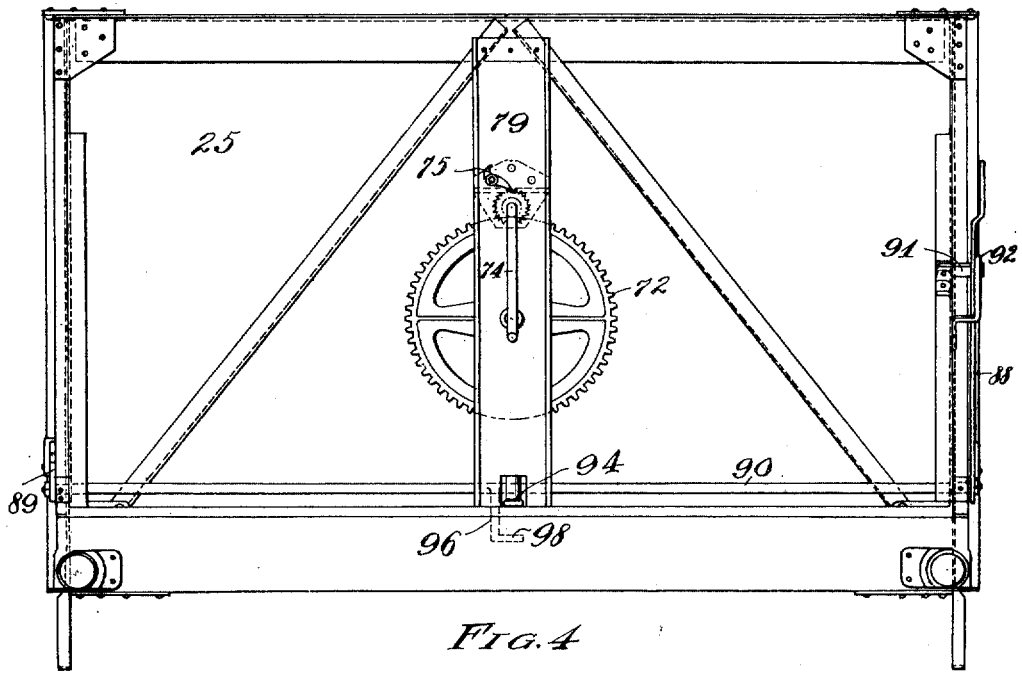
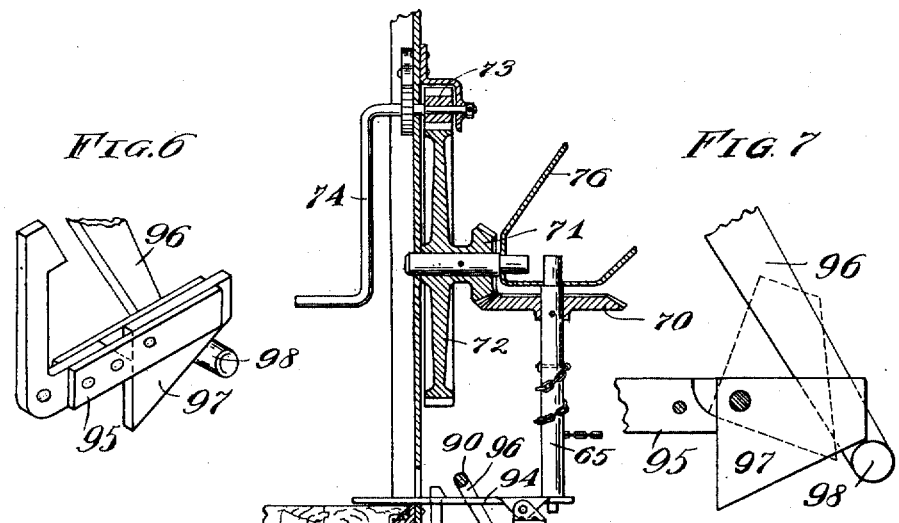

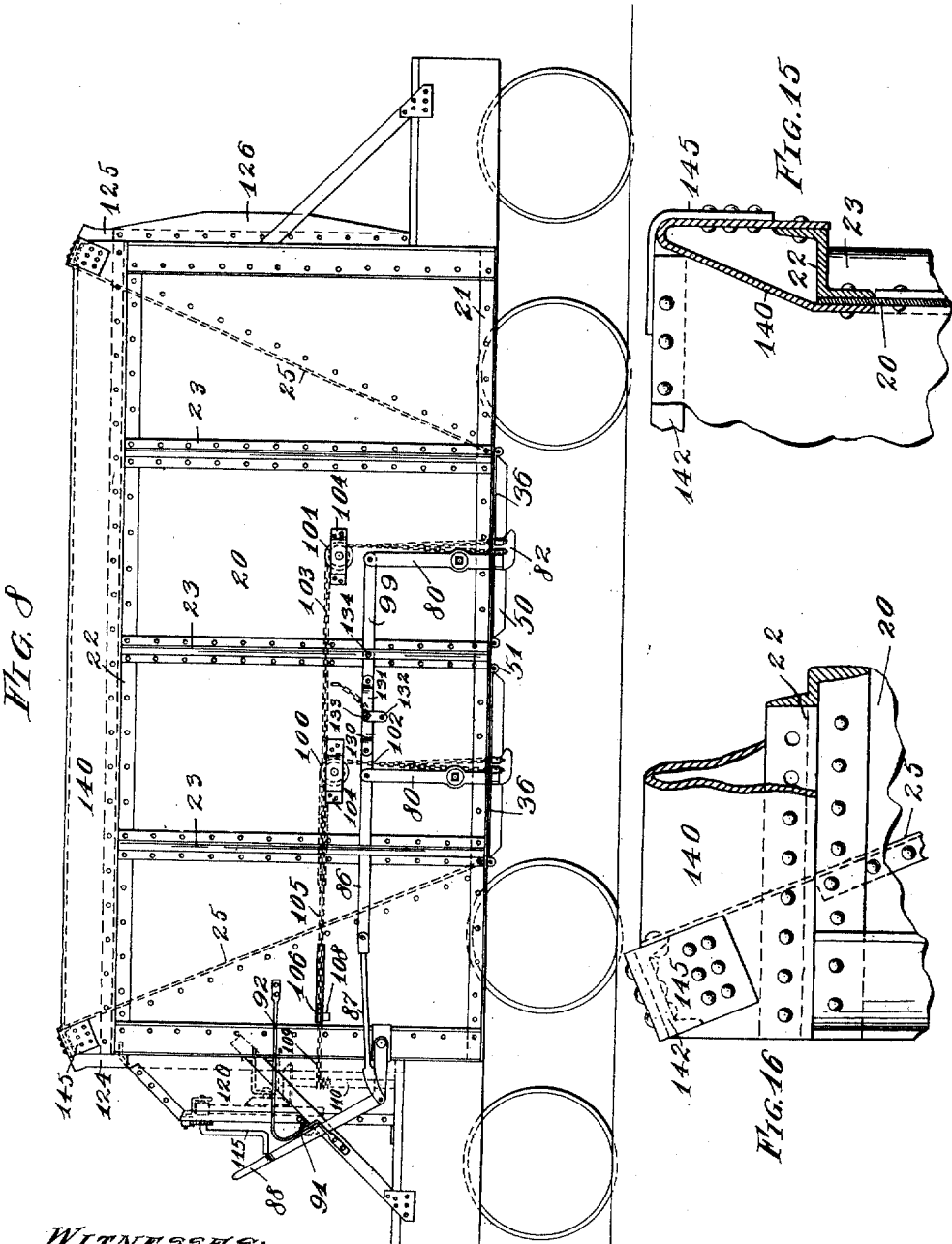

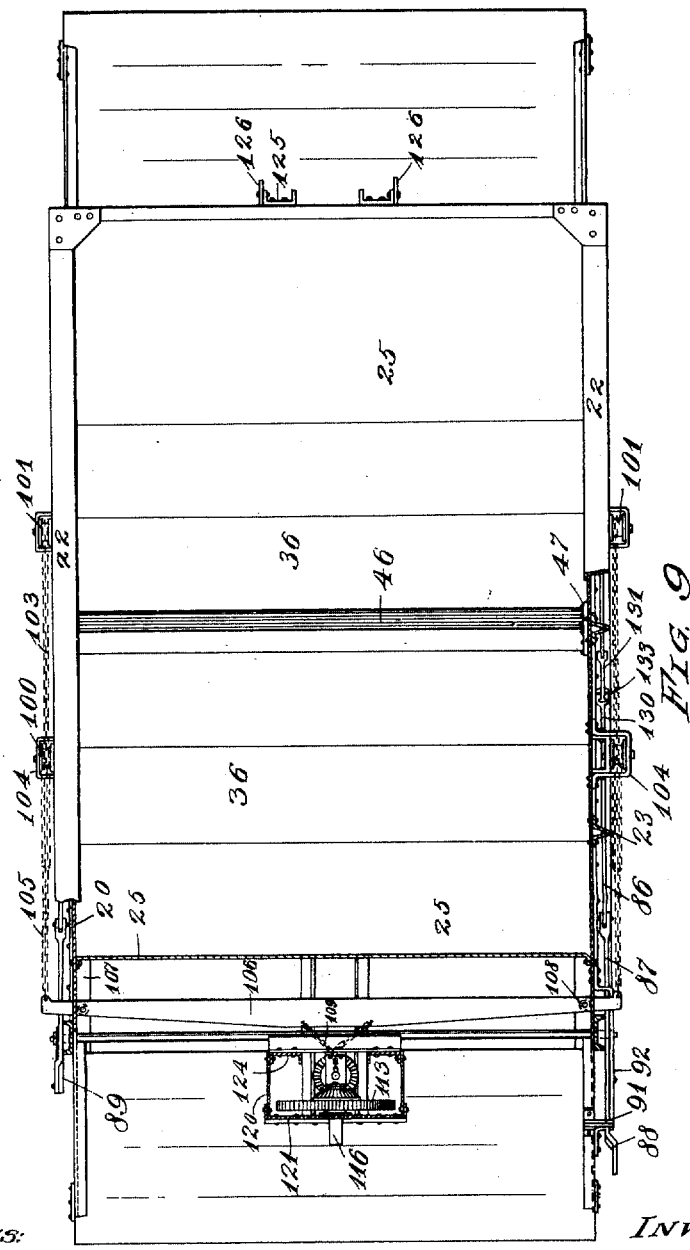

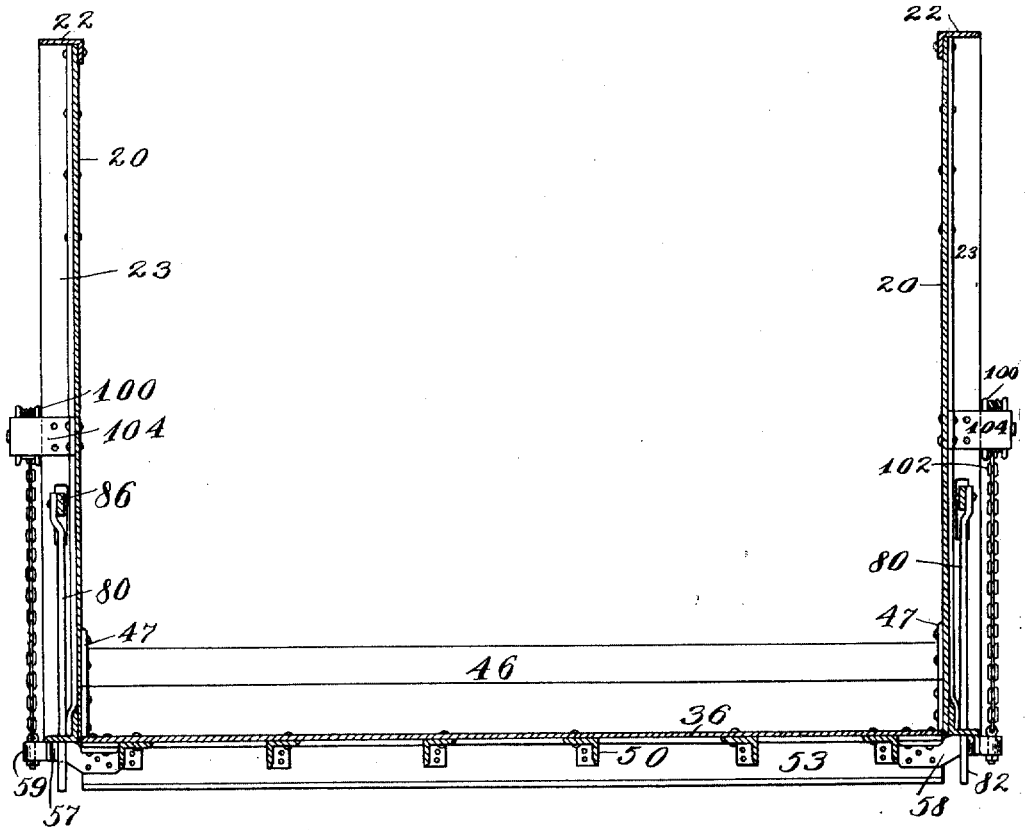

F. S. INGOLDSBY.
DUMP CAR.
APPLICATION FILED OCT. 17, 1907.

993,449.

Patented May 30, 1911.

8 SHEETS—SHEET 8.

WITNESSES:
Brennan B. West
Nathan F. Fretter

INVENTOR,
Frank S. Ingoldsby
By Bates, Fouts & Hull,
ATTYS.

UNITED STATES PATENT OFFICE.

FRANK S. INGOLDSBY, OF ST. LOUIS, MISSOURI, ASSIGNOR TO THE INGOLDSBY AUTOMATIC CAR COMPANY, OF ST. LOUIS, MISSOURI, A CORPORATION OF WEST VIRGINIA.

DUMP-CAR.

993,449.  Specification of Letters Patent.  Patented May 30, 1911.

Application filed October 17, 1907. Serial No. 397,900.

*To all whom it may concern:*

Be it known that I, FRANK S. INGOLDSBY, a citizen of the United States, residing at St. Louis, State of Missouri, have invented a certain new and useful Improvement in Dump-Cars, of which the following is a full, clear, and exact description, reference being had to the accompanying drawings.

The object of this invention is to provide an efficient dump car having transverse dumping doors. In my car there is not only raising mechanism to return the dropped doors but independent locking mechanism to support the doors when raised. The movement of the locking mechanism to releasing position operates automatically to disengage the raising mechanism.

My invention is adapted for cars having a longitudinal center member dividing the car into hoppers each side of the center as well as to cars where such center member is omitted.

My invention provides for equalizing the raising force at the two ends of the doors; it provides means whereby some of the doors may be operated without others, or all the doors conjointly; it provides for protecting the raising mechanism and bracing the end of the car; it provides a very strong, rigid and well braced car; it provides a flare top for the car, increasing its carrying capacity and ease of loading and at the same time stiffening the upper chords; and it provides other features, which will be apparent from the following description.

Figure 1:
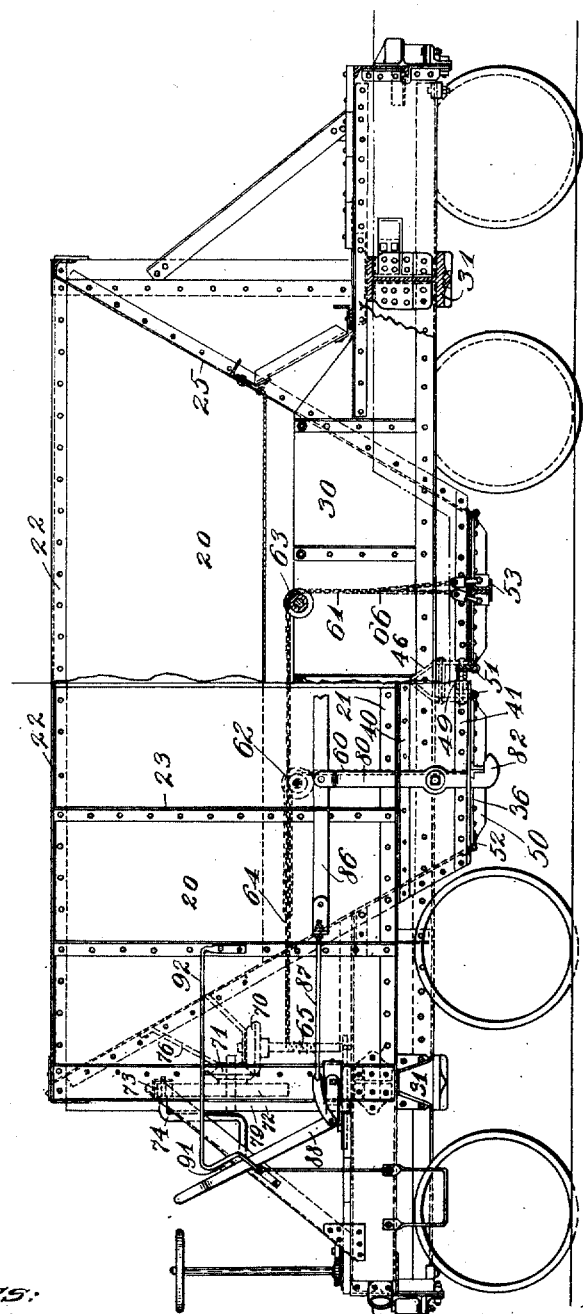
Figure 2:
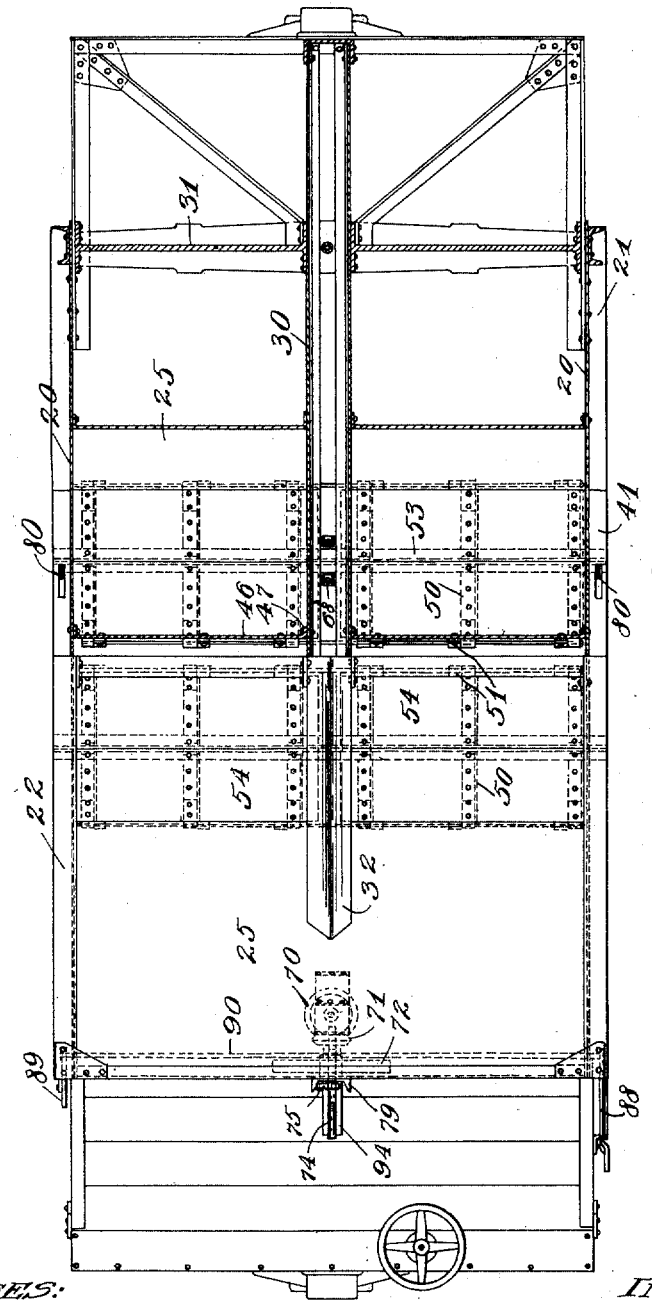
Figure 13:
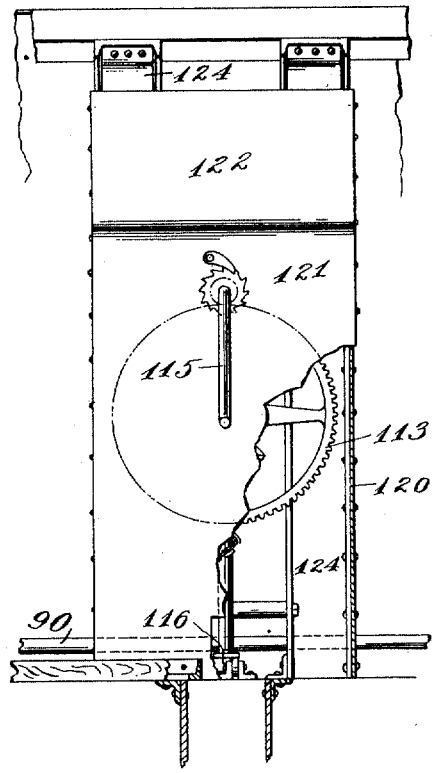
Figure 14:
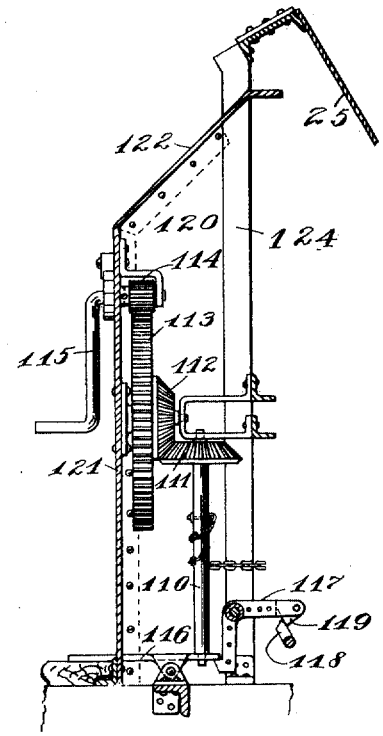

Figure 1 is a side elevation of one form of my car where there is a longitudinal center member, the right hand half of this view being sectioned through such member; Fig. 2 is a plan of such car; Fig. 3 is a cross section of the same; Fig. 4 is an end view of the car shown in the preceding figures; Fig. 5 is a vertical section through the winding mechanism of such car; Fig. 6 is a perspective view of a latch for holding the winding mechanism in engagement; Fig. 7 is a detail of a portion of such latch; Fig. 8 is a side elevation of my car where there is no longitudinal center member; Fig. 9 is a plan of such car; Fig. 10 is a cross section of such car; Figs. 11 and 12 are perspective views showing the ends of the floor beams; Fig. 13 is an elevation of the winding mechanism and its shield looking toward the end of the car; Fig. 14 is a vertical section through such winding mechanism; Fig. 15 is an enlarged section through an upper chord of the car showing the flare top; Fig. 16 is an elevation of such flare top; Figs. 17, 18, 19 and 20 are sections of modified forms of this top.

As shown in the various drawings, 20 represents a plate girder side of a car, which is provided with a lower chord 21, upper chord 22, vertical stiffeners 23. Leading upward from the bolsters are vertical main struts 24.

25 indicate sloping end floors which extend diagonally downward from cross beams carried by the upper ends of the main struts 24.

In the form of the car shown in Figs. 1 to 7 inclusive, there is a longitudinal center member housing a portion of the raising mechanism, while in the structure of the other views the corresponding portion of the raising mechanism is on the outer sides of the car. I will first describe the construction of Figs. 1 to 7.

As shown in Figs. 1 to 4, 30 represents vertical plates extending from one bolster 31 to the other. There are two of these vertical plates. Their upper ends are bent inward and are surmounted by a cap 32 of inverted V form, as shown in Fig. 3. 34 represent longitudinal angle iron stiffeners for this beam, which extend from bolster to bolster. 35 are vertical stiffeners which may also be angle irons. Connecting the plates 30 are suitable strut ties 29, comprising preferably a pipe between the plates and a bolt or rivet passing through the plates and pipe. This makes a strong, light and stiff longitudinal center member. The dumping doors extend transversely of the car, being arranged in two pairs. They are designated 36. These doors are horizontal when closed and support the load and are adapted to swing downward to discharge it. As shown in Fig. 1, they may be located in a plane below the main side sill of the car, thus increasing the carrying capacity. Thus between the trucks the car side 20 may extend downward, as shown at 38, being reinforced by an outside plate 39 and by angle stiffeners 40 and 41. The inclined end floor 25 reaches to the lower end of the side extension. The center member similarly has a downward extension, as shown in Fig. 3, the side plates 30 continuing between the trucks below the stiffeners 34 and being braced by stiffeners 44. 46 represents a cross member extending transversely at the center of the car. This member is made of plates flanged outwardly at its edges, as shown at 47, and riveted to the car sides and the center member. The cross member is laterally braced by strut ties 49, similar to the strut ties 29. The dumping doors 36 are arranged in two pairs hinged at the lower edges of the end floors and cross beam. These dumping doors comprise floor beams 50 arranged longitudinally of the car and connected at their outer ends by hinged eyes 51 and 52 with the center beam and end floor. At their free ends the floor beams abut and are riveted to a cross beam 53 which is preferably a channel. Covering the upper face of the floor beams and cross beam are the floor plates 54. The supporting grating provided by the floor beams 50 and the channel 53 extends transversely the full width of the car. The floor plates, as shown in Fig. 3 extend sufficiently to bridge the distance from the car sides to the center member.

As shown in Figs. 1 to 7, the raising mechanism includes flexible members housed within the longitudinal center member and connected to the mid points of the cross channels 53 of the doors. This flexible raising mechanism may consist of a pair of chains 60 and 61 running respectively over the pulleys 62 and 63, the chain 61 also running over the pulley 62 and the two chains being connected together at some suitable point as 64, the extreme end of the chain being secured to the winding shaft 65. Near its other end the chains divide into two parts at 66, the free ends being connected to the cross channels 53 of a pair of doors. This connection may be conveniently made by an eye-bolt 67 pivotally connected with the channel beam 53 and connected by a shackle 68 with one of the free ends of the chain, as illustrated by 69 in Fig. 3. In such form the yoke of the shackle locks the nut on the eye-bolt against turning, while the removal of the eye-bolt pin or the shackle pin allows the turning of the eye-bolt or shackle to turn the nut and thereby adjust the effective length. The pulleys 63 and 62 may be carried on two of the strut ties 29. The chains lead from these pulleys substantially horizontally to the winding shaft 65 located beneath the inclined end of the floor. This winding shaft may be provided at its upper end with a gear 70 meshing with a pinion 71 rigid with a large gear 72 with which meshes a pinion 73 on a crank shaft 74. This provides a powerful winding mechanism, a suitable ratchet and pawl 75 being provided to hold the gain made. As shown, the upper ends of the winding shaft 65 and the inner end of the shaft 77 on which the pinion 71 and gear 72 are mounted are journaled in a plate member 76 secured to the under side of the end floor. The outer end of the shaft 77 is journaled in a suitable vertical channel beam 79. To effectively support the doors when raised, I provide locking levers 80 which are pivoted on bosses 81 secured to the car side a short distance above its lower edge. These levers project downwardly through slots in the stiffeners 41 and are provided at their lower ends with hooks 82 which engage beneath the projecting ends of the transverse channel beams 53 or suitable extensions of said beams. As shown in Figs. 1 and 3, these channels are cut off to allow the hook to engage beneath the web thereof, and a notch 83 is made in the upper flange of the channel, as shown in Fig. 11, whereby the channel makes a hook engaging the outer side of the lever 80. The hook 82 as well as the end 85 of the channel are beveled so that as the hook comes into place the doors are forced tightly home and at the same time the car sides are drawn inward, preventing any lateral spreading. The levers 80 are operated by links 86 and 87 connected on one side with an operating lever 88 and on the other side with a rock arm 89 similar to the portion of the lever between the connection of the link 87 and its pivot. The pivot of the lever comprises a rock shaft 90 extending crosswise of the car to which both the lever and the arm referred to are rigidly connected. Thus the movement of the one lever operates the links and locking hooks on two sides of the car. When the doors are closed, the lever and hooks are maintained in locked position by a lock bar 91 which is turned down between the lever 88 and a suitable guard 92. In order to relieve the torsion on the rock shaft 90 I form a bend in the lever 88 so that as the hooks are just coming into final position where the strain is greatest the pivot of the link 87 is approaching the dead center. As the lever 88 is thrown forward to release the doors, it is desirable to automatically disengage the winding mechanism to prevent the crank 74 being thrown around violently. I accordingly mount the lower end of the winding shaft 65 in a pivoted foot lever 94. This lever is normally held by a latch 95 in position to hold the shaft 65 with its gear 70 meshing with the pinion 71. As the lever is being thrown forward, however, a lug 98 on a rock arm 96 on the shaft 90 engages a dog 97 on the latch and moves that latch to release the lever 94, thereby allowing the winding shaft 65 to drop, breaking the connection between the gear 70 and pinion 71. When the operator desires to elevate the doors, he first places his foot on the lever 94, thereby returning the shaft 65 and the gears into engagement. In such returned position the parts are held by the latch 95. When the doors have been elevated, the lever is returned to normal position to lock the doors, as shown in Fig. 1, and in this movement the lug 98 passes idly beneath the pivoted dog 97.

It will be seen from the above description that I have provided a raising mechanism for cars having a longitudinal center member at a point where it is entirely out of the way and protected. My raising mechanism is simple and is easily adjusted. By drawing up on the center of the door beams the seating of the two ends of the door against the car side automatically equalizes itself. If either end of the door should bend down or sag, it is engaged by the bevel on the hook 82 and is forced by it snugly into place. The edges of the doors, as shown, are flexible, which allows them to be bent up so as to make a very snug and tight joint. Thus not only are my doors easily brought into place, but when locked are forced still tighter shut, making a tight bottom and preventing leakage.

Much of the description already given is applicable to my car of this type where there is no longitudinal center member, this construction being shown in Fig. 8 and following. In this view I have shown the doors 36 as arranged substantially on the same level with the main lower chord 21 of the car side. In this embodiment the doors when raised are locked by the same system of locking levers 80, links 86—87, and main operating lever 88 as before, but the raising chains are carried on the outer sides of the car. As shown in Fig. 8, the pulleys 100 and 101 over which the operating chains 102 and 103 take are carried by straps 104 riveted to the car side. These chains extend horizontally just outside of the vertical stiffeners 23 through which the link 86 passes. After passing over the pulley 100 toward the end of the car, two chains are joined into a common chain 105. This common chain is connected at its end to the end of a yoke 106 extending crosswise of the car, this yoke being supported on suitable longitudinal bars 107 and guided by wheels 108. A main chain 109 leads from the center of the yoke to the winding shaft 110. By this arrangement the pull exerted by the rotation of the winding shaft is equalized on the two sides of the car, and each end of each door is drawn snugly into place. As shown in Fig. 12, I may provide forgings 58 riveted to the transverse floor beams 53 and provided at their outer ends with eyes to receive adjusting eye-bolts on the lower end of the chains 102 and 103. Between the eyes and the end of the channels one of each pair of these forgings has hooked or beveled shoulders 57 to engage the sides of the locking levers 80. The winding shaft 110 has the arrangement already described of a driving gear 111 meshing with gear 112 rigid with gear 113 with which meshes a pinion 114 on the shaft of the crank 115. Similarly, the lower end of the shaft 110 is supported by a raising lever 116 which is normally held upward by a latch 117 Fig. 14. This latch is released by the rock arm 118 on the rock shaft 90, which operates on the dog 119 to raise the latch when the lever is thrown to release the hooks, this arm passing idly beneath the dog when the lever locks the doors.

I mount the raising gearing in a suitable housing at the end of the car, this housing comprising the vertical longitudinal plates 120, riveted to the outer flanges of the two vertical channels 124, and the vertical transverse plate 121 flanged over and riveted to the plates 120 and having its upper portion bent to form a roof plate 122. This not only makes a protection for the winding mechanism, insuring it against damage from falling material and providing it with a shedding roof to discharge such material, but it also makes an effective brace and stiffener for the end of the car, the side plates 120 acting as gussets. Sufficient room is also provided for the travel of the yoke 106. The other end of the car may be stiffened by channels 125 and plates 126, as shown in Fig. 8, to give it sufficient strength.

To enable the locking lever to release one half of the car independently of the other, I may provide a breaking joint in the link 86. This is shown in Fig. 8 and comprises two bell cranks 130 and 131 pivoted at 132 and provided with a pair of alined holes adapted to be occupied by a pin 133. When the pin is in this position, the link 86 is rigidly coupled with the extension 99 thereof. When only the doors nearest the operating end of the car are to be discharged, the pin 133 is withdrawn from the bell cranks and passed through an opening 134 in one of the stiffeners 23 into the link 99, thereby locking that link and allowing the bell cranks to buckle, so that when the lever is thrown only the doors nearest that end of the car will be operated.

If desired, a separate winding mechanism may be provided for each pair of doors by locating another winding, disengaging, and locking mechanism on the opposite end of the car.

Figure 17:
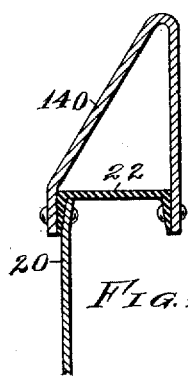
Figure 18:
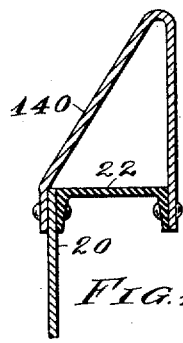
Figure 19:
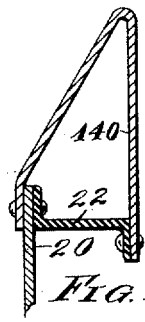
Figure 20:
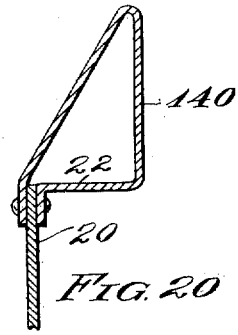

To increase the capacity of the car and provide a wider space for grab buckets or other loading means to discharge into, thus decreasing the amount of material which is apt to be spilled alongside of the car as the same is being loaded, I may secure along the upper edge of the car a flare top. This is illustrated in Figs. 8 and 15 to 20 inclusive. As shown in Figs. 8, 15 and 16, this flare top is provided by the upper chord 22 of the car side being made in the form of a Z bar and an upper ridge-shaped sheet metal member 140 riveted to the outer flange of the Z and to the inner side of the car. At the ends of the car are provided transverse diagonally placed channels 142 to which the upper end of the end floor is secured, this channel being secured to the outer sides of the flare top by corner gusset straps 145. Figs. 17 to 20 show modified forms of this flare top. In Fig. 17 the same is provided by a channel 22 and the ridge 140, the channel extending across the upper end of the car side 20 and having its flange between the car side and the lower end of the ridge. In Fig. 18 there is also a channel forming the upper chord 22 of the car side, but the channel engages the outer face of the car side. Fig. 19 shows a Z-bar for the upper chord, but with the flanges turned in the opposite direction from Fig. 15. Fig. 20 shows the upper chord and ridge piece made in one sheet metal member. This flare top stiffens and strengthens the upper chord of the car side. It also puts the resistance to bulging more nearly where it theoretically belongs, that is, some distance below the extreme top of the car. The ridge form of this flare top prevents any lodging place on which material might rest. The flare top extends outwardly substantially to a line with the outer side of the stiffening members, this space being available without effectively widening the car.

Reference is hereby made to my copending application #403,919 where certain features of the car illustrated in the drawings hereof are claimed.

I claim:

1. In a dump car, the combination of transverse dumping doors, flexible raising mechanism therefor extending longitudinally at the central part of the car, and locking mechanism independent of the raising mechanism and carried only by the car sides.

2. In a dump car, the combination of a pair of transverse dumping doors hinged at opposite edges, flexible raising mechanism adapted to engage such doors and located at the center of the car, and locking mechanism carried only by the car sides.

3. In a dump car, the combination of transverse dumping doors arranged in pairs, flexible raising mechanism adapted to engage such doors near their meeting edges, and locking mechanism carried only by the car sides.

4. The combination in a dump car, of transverse dumping doors arranged in pairs with their traveling edges facing each other, flexible raising mechanism, and locking hooks carried by the car sides, each locking hook adapted to support the same end of both doors.

5. The combination in a dump car, of transverse dumping doors, flexible raising mechanism located at the center of the car, and locking hooks carried only by the car sides and adapted to engage the projecting ends of the floor beams of the doors.

6. The combination in a dump car, of a longitudinal center member, transverse doors, door raising mechanism occupying the center member, a door locking mechanism carried only by the car sides.

7. The combination in a dump car, of a longitudinal center member, transverse doors, flexible door raising mechanism occupying the center member, and door locking hooks carried only by the car side.

8. In a dump car, the combination of inclined end floors, a cross beam, two pairs of dumping doors hinged on transverse axes adjacent the cross beam and the lower end of the end floors respectively, each of said dumping doors having longitudinal floor beams and a transverse cross beam on their under sides, said cross beams being independent of each other, raising mechanism connected with said cross beams, and locking mechanism also arranged to coöperate therewith and consisting of hooks, each hook adapted to engage two floor beams of two doors.

9. In a dump car, the combination of a raising mechanism, winding mechanism therefor at the end of the car, and a housing for such winding mechanism, said housing having vertical plates forming also a brace and stiffened for the car end.

10. In a dump car, the combination of transverse dumping doors arranged in pairs, floor beams projecting outwardly from such doors, and beveled hooks on the car side each adapted to engage such projections of both doors.

11. In a dump car, the combination of transverse dumping doors arranged in pairs, floor beams projecting or carrying projections from such doors outwardly, a beveled shoulder on one of the projections of a pair, hooks on the car side adapted to engage such projections, and means for moving such hooks.

12. In a dump car, the combination of transverse dumping doors arranged in facing pairs, projections from such doors outwardly, hooks on the car side, each adapted to engage two of such projections upon a pair of doors, and means for locking the hooks.

13. In a dump car, the combination of transverse dumping doors arranged in pairs, projections from such doors outwardly, hooks on the car side each adapted to engage the projections of both members of the pair, a transverse rock shaft, and arms thereon connected with the hooks, and means for rocking such shaft.

14. In a dump car, the combination of dumping doors, projections from such doors outwardly, hooks on the car side adapted to engage such projections, a transverse shaft, and arms thereon connected with the hooks, and means for rocking such shaft, the connection to said arms approaching the dead center as the hooks come into final position.

15. The combination with the car sides, of doors having flexible edges adapted to engage members at their outer ends whereby a tight joint may be insured.

16. The combination with the car sides, of transverse doors having flexible edges and beveled supporting hooks whereby a tight joint may be secured.

17. The combination with a car having a plurality of transverse doors, releasing mechanism therefor, and a breaking joint in such releasing mechanism to allow an independent operation of the doors.

18. The combination in a dump car, of transverse dumping doors, hooks pivoted to the sides of the car and adapted to engage projections from said doors, a link connecting said hooks, and a breaking joint in said link.

19. The combination of a pair of transverse dumping doors having free edges adapted to be adjacent when the doors are closed, and a hook on the car side adapted to engage both doors of the pair.

20. The combination with the car sides of a hollow metal outwardly flaring top adapted to form a wall for a portion of the load and acting also as a stiffener for the upper chord.

21. The combination of a plate girder side having a rolled form along its upper edge and a flare top consisting of a sheet metal ridge secured to such rolled form and secured also to the upper end of the car side.

22. The combination of a car side, and a flare top consisting of a ridge secured to the upper end of the car side, the outer face of said ridge extending substantially vertical and the inner edge inclined and at its lower end being flush with the inner side of the car side to increase the capacity of the car.

23. The combination of a plate girder side having a rolled form along its upper edge and a flare top consisting of a sheet metal ridge, secured to the outer side of such rolled form and secured also to the upper end of the car side, the outer face of said ridge extending substantially vertical and the inner edge inclined to increase the capacity of the car.

24. The combination of a plate girder side having a rolled form along its upper edge and a flare top consisting of a sheet metal ridge secured to the outer side of such rolled form and secured also to the upper end of the car side, and a cross beam at the upper end of the car between the flare tops of the two sides.

25. The combination of an inclined end floor, a plate girder side having a rolled form along its upper edge and a flare top consisting of a sheet metal ridge secured to the outer side of such rolled form and secured also to the upper end of the car side, and a cross beam at the upper end of the car between the flare tops of the two sides, said cross beam comprising a channel to which the inclined end floor of the car is secured.

26. The combination with a car side having vertical stiffeners, pivoted locking hooks supported by the side, an operating link connecting with said hooks and extending through openings in the stiffeners, and transverse doors which said hooks are adapted to support.

27. The combination, in a dump car, of transverse doors, each door having a skeleton frame extending crosswise from side to side of the car, a floor plate mounted upon said frame, the ends of said floor plate being flexible, whereby they coöperate with the sides of the car to form a tight joint.

28. The combination, in a dump car, of a longitudinal center member, and cross struts for bracing the sides of the said center member, said struts comprising cylindrical members through which extend bolts to secure them to the sides of the center member.

29. In a dump car, the combination of dumping doors, flexible raising members connected to said doors, operating mechanism connected to said flexible members, said operating mechanism being at the end of the car, and a housing for inclosing said operating mechanism and acting also as a stiffener for the car end.

30. In a dump car, the combination of transverse dumping doors, flexible members connected thereto, a winding mechanism located at the end of the car and connected with the flexible raising members, and a housing for said winding mechanism, said housing having vertical plates which form stiffening elements for the end of the car.

31. In a dump car, the combination of a longitudinal center member and transverse doors, flexible raising mechanism occupying the center member and connecting all the doors, winding mechanism for the raising mechanism located at the end of the car, and a housing inclosing said winding mechanism, said housing having vertical plates forming a brace for the end of the car.

32. In a dump car, the combination of dumping doors hinged in pairs, flexible members secured to each pair of doors, all of said flexible members being connected to a common flexible member, a winding member connected with the common flexible member, and a supporting hook adapted to engage both doors of a pair.

33. In a dump car, the combination of transverse doors hinged in pairs, flexible members connected to each of said doors, all of the said flexible members being connected to a common flexible member, a winding mechanism for said common flexible member, and a supporting hook adapted to engage both doors of a pair.

34. In a dump car, the combination of a longitudinal center member, transverse doors, flexible members connected with each of the said doors, and all of said flexible members connected to a common flexible member, all of the said flexible members occupying the space within the center member, a winding mechanism for said common flexible member, and a supporting member on the side of the car adapted to engage a plurality of doors.

35. In a dump car, the combination of transverse dumping doors arranged in pairs, projections from such doors, hooks upon both sides of the car adapted each to engage such projections of a pair, and a single lever for operating all of said hooks.

36. In a dump car, the combination of transverse dumping doors arranged in pairs, projections from such doors, hooks upon both sides of the car adapted each to engage such projections of a pair, a single lever for operating all of said hooks, and means for locking the said lever in a position to lock the hooks upon the side of the car.

37. In a dump car, the combination of doors, raising mechanism therefor, a shaft adapted to operate said raising mechanism, means for operating said shaft, a member adapted to hold said shaft in operative relation to its operating means, a latch for holding the last mentioned member, and means which, when moved in one direction, will engage the said latch to disconnect the aforesaid shaft and its operating means, and when moved in the opposite direction passes by the latch.

38. In a dump car, the combination of dumping doors, raising mechanism therefor, a shaft for operating said raising mechanism, means for operating said shaft, a member adapted to hold said shaft in operative relation with its operating means, a latch for holding said member, said latch being provided with a pivoted dog, a member adapted when moved in one direction to engage said dog upon the latch to operate the latch whereby the aforesaid shaft will be disconnected from its operating means, said member, when moved in the opposite direction, engaging the dog and throwing the same out of its path of movement.

39. In a dumping car, the combination of dumping doors, raising mechanism therefor, a shaft for operating said raising mechanism, means for operating said shaft, a member for holding the shaft in operative relation to its operating means, a latch for holding said member in place, a pivoted dog upon said latch, locking mechanism upon the sides of the car adapted to engage the doors to lock the same, a shaft for operating said locking mechanism, an arm upon said shaft, said arm being adapted to engage the dog upon the latch when the locking mechanism is released to release the latch and disconnect the aforesaid shaft from its operating means, said arm, when moved in the opposite direction, engaging the dog and throwing the same out of its path of travel.

In testimony whereof, I hereunto affix my signature in the presence of two witnesses.

FRANK S. INGOLDSBY.

Witnesses:
J. R. BOWLING,
ALBERT H. BATES.

---

Copies of this patent may be obtained for five cents each, by addressing the "Commissioner of Patents, Washington, D. C."